A. KUEHN.
TRACTION WHEEL MOUNTING.
APPLICATION FILED JAN. 17, 1912.
1,048,322.
Patented Dec. 24, 1912.
2 SHEETS—SHEET 1.
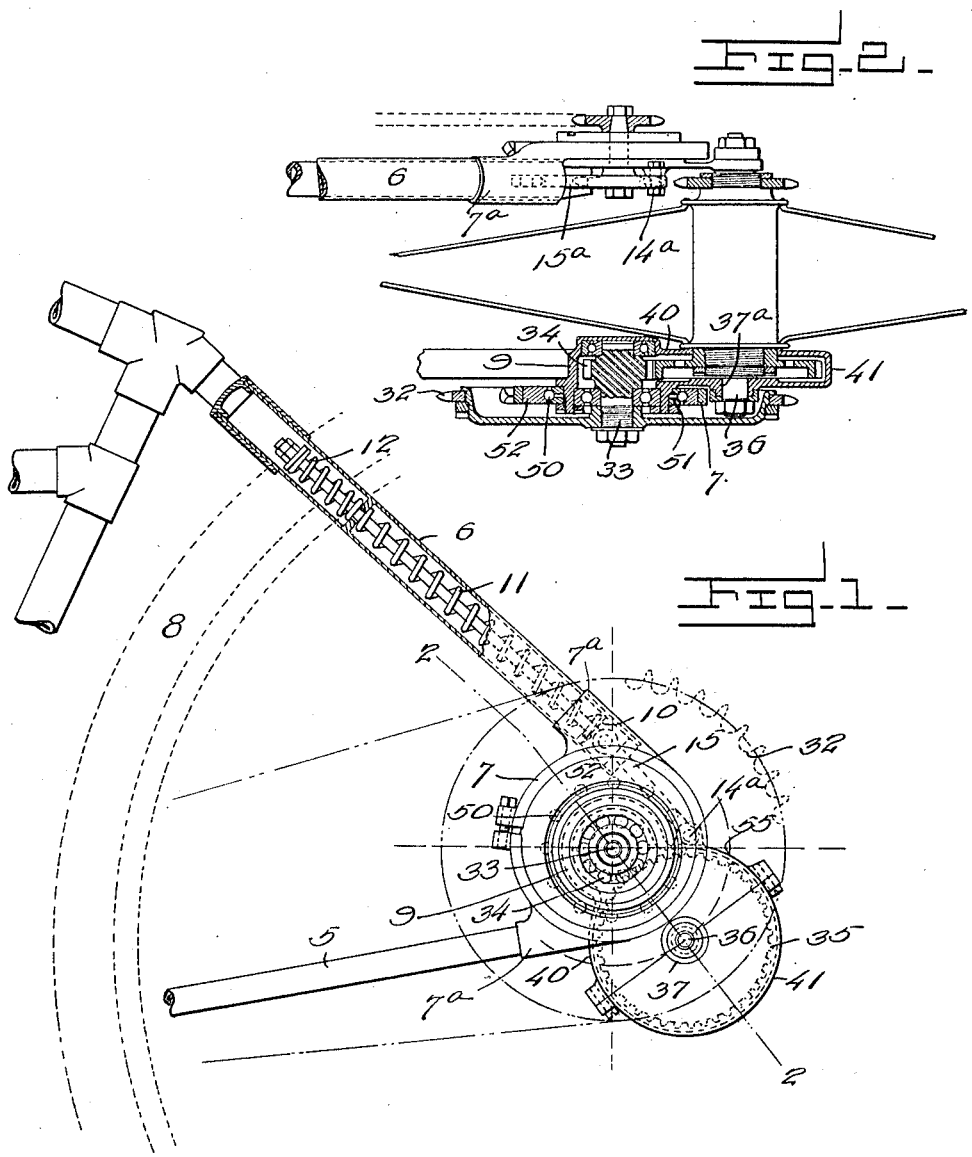
Inventor
Alfred Kuehn,
Witnesses
By
Attorney A. KUEHN.
TRACTION WHEEL MOUNTING.
APPLICATION FILED JAN. 17, 1912.
1,048,322.
Patented Dec. 24, 1912.
2 SHEETS—SHEET 2.
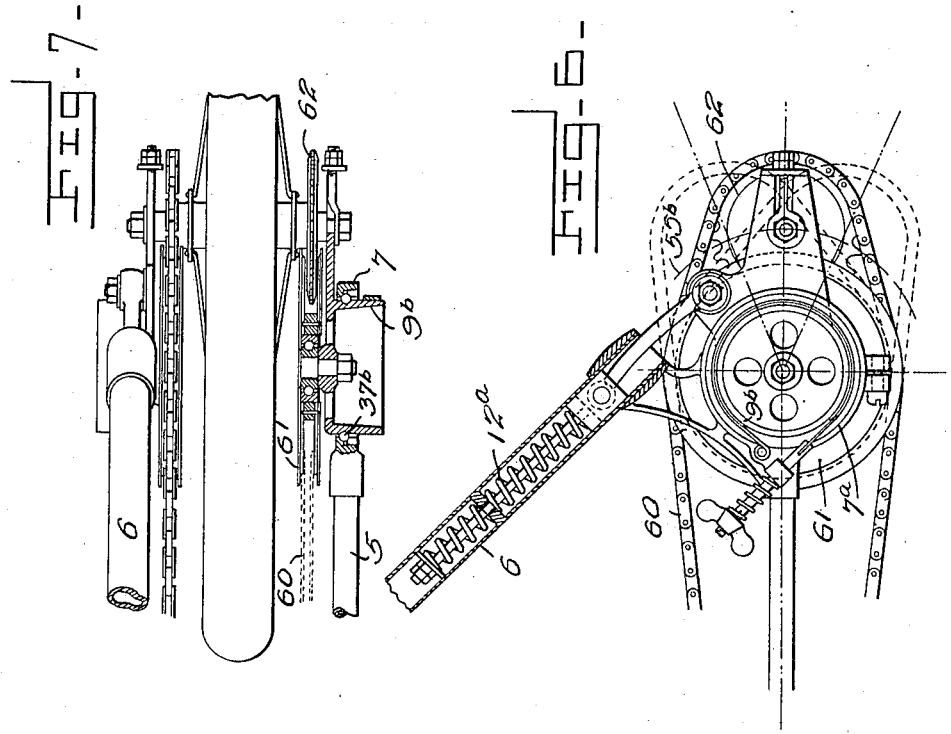
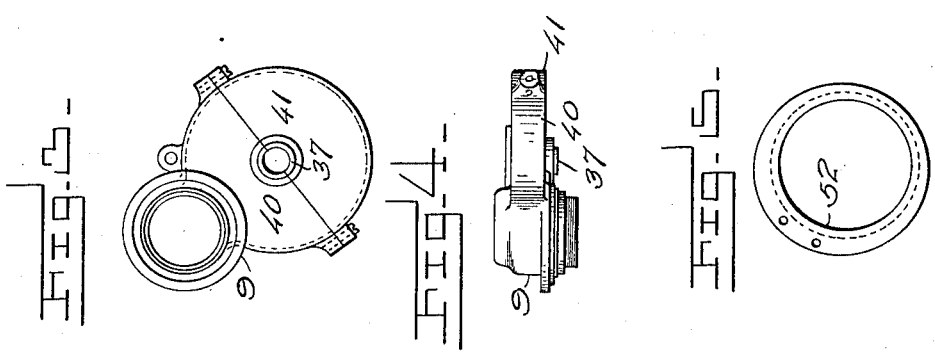

UNITED STATES PATENT OFFICE.

ALFRED KUEHN, OF CHICAGO, ILLINOIS.

TRACTION-WHEEL MOUNTING.

1,048,322. Specification of Letters Patent. Patented Dec. 24, 1912.

Original application filed July 22, 1911, Serial No. 639,885. Divided and this application filed January 17, 1912. Serial No. 671,645.

*To all whom it may concern:*

Be it known that I, ALFRED KUEHN, a subject of the Emperor of Germany, and a resident of the city of Chicago, in the county of Cook and State of Illinois, have invented certain new and useful Improvements in Traction-Wheel Mountings, of which the following is a specification.

My invention relates particularly to forked-frame bicycles and like vehicles having a spring-carried wheel mounting in connection with a rigid frame construction such as set forth in my pending application Serial No. 639,885, filed July 22nd, 1911, of which this application is a division; the present invention relating especially to an improved rear or traction wheel mounting in which the driving of the spring-carried wheel is so effected as to permit of its swinging rearward and upward without varying the tension of the chain, as fully described in connection with the accompanying drawings, and the novel features of which are specifically pointed out in the claims.

Figure 1 is a side elevation of the rear portion of the forked frame of a bicycle, showing my invention as preferably applied thereto; the drive belt wheel being located outside the frame and the chain or other belt connecting direct with the motor. Fig. 2 is mainly a cross-sectional view on the line 2—2 of Fig. 1; the pedal drive side being a full top view. Figs. 3 and 4 are separate views of the pivoted wheel carrier, and Fig. 5 of the adjustable eccentric bushing for the terminal rings. Figs. 6 and 7 are similar views to Figs. 1 and 2, indicating a modified construction adapted for an inside drive from a countershaft, and embodying the main features of my invention.

Each member of the rear frame fork indicated is made up of the angularly arranged bars 5 and 6 rigidly joined by a terminal wheel-carrier ring 7; and in each of these rings is mounted a swinging wheel carrier provided with eccentrically arranged axle bearings and connected with spring mechanism for regulating its swinging movement around the axis of its ring 7; this general construction corresponding with that set forth in my pending application referred to.

As shown in Figs. 1 and 2, the connecting terminal rings 7, 7 of the fork members are set in a plane outside of the latter to provide for the usual "outside drive" from the motor; this being effected by forming the connecting bosses 7ª 7ª on the inner side thereof. The traction wheel 8 is pivotally carried in these rings 7 by means of wheel carriers 9 the ring portions of which are rotatably mounted in said ring, and which are formed with extensions 40 having axle bearings 37 eccentric to the axis of the rings 7 about which they swing; and the extent of this swing at a suitable distance under varying load and strains being controlled by spring-backed slides 10 guided by the bars 6 of the frame fork and connected by links 15 to the swinging carrier as more fully set forth in my pending application referred to.

The transmission, as shown, being direct from the motor to the belt wheel 32 on the shaft 33, provision is made for gearing down in connection with the wheel mounting, the shaft 33 being provided with a pinion 34 arranged in mesh with a larger gear 35 fixed to the axle 36 of the rear vehicle wheel. The belt wheel shaft 33 is centrally mounted in the ring portion of the wheel carriers 9, and the axle is mounted in the eccentrically arranged bearings 37 of said carriers; which bearing is located beyond the periphery of the terminal ring 7 so as to space apart the shaft and axle sufficiently to permit of employing the reducing gears 34, 35. The axle-bearing extension 40 of the wheel carrier, which is thus required to provide for the axle bearing 37, is preferably arranged to form a gear wheel casing, the outer half 41 of which is removably secured as shown; and the circular pivoting portion of said carrier is also specially shaped so as to inclose the pinion 34 and provide bearings (preferably anti-friction as shown) on both sides of the latter, for the shaft 33. In the preferred construction shown an exterior ball bearing 50 is also provided for the circular portion of the carrier 9, said bearing comprising a conical ring 51 which may be adjusted so as to furnish any desired amount of shock-absorbing friction.

In order to provide for conveniently taking up slack in the belt, the terminal ring 7 of the rear frame fork has a bushing ring 52 adjustably clamped therein; said bushing ring having an eccentric opening the circular surface of which forms the inclosing wall for the circular portion of the wheel carrier 9. The swing of the extended wheel carrier, with the wheel mounted therein at 37, is at all times concentric with the drive wheel shaft 33, so that the belt is kept uniformly tight, and the arc 55 to which the swing is confined by the controlling springs 11 12 provides a combined rearward and upward movement when the wheel 8 strikes an obstruction. The belt wheels are of large diameter and may be readily changed from sprockets to grooved or flat, or vice versa, as desired by the rider, while the manufacturer employs but one type of frame. The proper gear ratio is readily provided, and both the gears and driver are well protected.

An important effect of my improved rear wheel mounting and drive mechanism, is that it prevents wheel slippage and tire wear which is apt to occur when the first power impulse is positively applied by a chain drive; a seriously objectionable action which is commonly guarded against by employing a yielding or "compensating" sprocket wheel. In my improved construction as illustrated in Figs. 1 and 2, it will be noticed that the effect of resistance to sudden rotation of the vehicle wheel by the first power impulse will cause the pinion 34 of the belt wheel shaft to ride upward and rearward upon the meshing gear 35 of the traction wheel, as is permitted by the yielding of the controlling spring 12, until the first undue strain is absorbed, after which the resulting reaction assists in starting the machine forward without slippage.

While the rear wheel mounting and drive mechanism already particularly described, embodies my complete invention in what I consider the most advantageous application, it will be readily understood that the main features thereof may be adapted to the commonly employed countershaft construction and inside drive belt; as is indicated in the modified construction illustrated in Figs. 6 and 7. In this case the traction wheel axle is mounted in bearings 37$^b$ of the wheel carrier 9$^b$, and is similarly swung in an arc 55$^b$ about the center of the terminal ring 7$^a$, as controlled by the springs 12$^a$. The drive belt 60 however, extends from the countershaft sprocket, over a large belt wheel 61 which is centrally mounted in the circular portion of the wheel-carrier 9$^b$, and thence over a small sprocket 62 on the vehicle wheel hub or axle; the latter being thus driven directly from the countershaft without employing reducing gears as in the previously described construction, but only in coöperation with the large belt wheel 61 on the pivotal axis of the wheel carrier. It will be seen that the traction wheel 8 can swing with the wheel carrier around the axis of the fixed terminal ring 7$^a$, between the extreme positions indicated in dotted lines, without affecting the length of the belt; such swing however being preferably limited ordinarily by the connected controlling springs, to the lower portion of the arc, so as to get such benefit of the combined rearward-and-upward movement referred to as this modified construction permits of.

Other modifications of the preferred construction particularly described may be readily made without departing from the main features of my invention; it being obvious for instance that the equally well known shaft-and-bevel-gears might be substituted for the belt drive illustrated, or a chain and sprocket wheels, such as is indicated on the pedal drive side of the machine, for the reducing gears shown for the motor transmission; and that my improved wheel mounting is adaptable to other vehicles than bicycles in connection with which it is specifically set forth.

What I claim is:—

1. In a traction wheel mounting for vehicles the combination with a frame fork and wheel-carriers pivotally connected to the terminals of the fork members and provided with eccentrically arranged axle bearings and spring-controlled frame connections for regulating the pivotal swing thereof, of a traction wheel axle mounted in said bearings and provided with a drive wheel fixed thereto, and a coöperating drive wheel having its axis coincident with the pivotal axis of the carriers.

2. In a traction-wheel mounting for vehicles, a forked frame the spread members of which are provided with fixed terminal rings, a swinging wheel-carrier rotatably mounted in each of said rings and provided with an axle-bearing extension, spring-controlled frame connections to said carriers for regulating the swinging movement thereof in the rings, and coöperating drive wheels arranged concentric with said carriers and axle bearings respectively.

3. In a traction-wheel mounting for vehicles the combination with a frame fork having its ends provided with fixed terminal rings, eccentrically formed bushing rings adjustably secured in said terminal rings, wheel carriers having circular ends rotatably mounted in said adjustable bushing rings and formed with axle-bearing extensions, spring-controlled connections for regulating the pivotal swing of said axle-bearing extensions, a traction wheel axle mounted in said bearings, a drive gear comprising coöperating wheels arranged concentric with said terminal rings and axle respectively.

4. In a traction-wheel mounting for vehicles the combination with a frame fork having its ends provided with fixed terminal rings, eccentrically formed bushing rings adjustably secured in said terminal rings, wheel carriers having circular ends rotatably mounted in said adjustable bushing rings and formed with axle-bearing extensions, spring-controlled connections for regulating the pivotal swing of said axle-bearing extensions, means for providing regulated friction between said bushing ring and the wheel carrier and rotatably mounted therein, a traction wheel axle mounted in said bearings, a drive gear comprising coöperating wheels arranged concentric with said terminal rings and axle respectively.

5. In a traction-wheel mounting for vehicles the combination with a frame fork and wheel-carriers pivotally connected to the terminals of the fork members and provided with eccentrically arranged axle bearings and spring-controlled frame connections for regulating the pivotal swing thereof, of a traction wheel axle mounted in said bearings and provided with a drive wheel fixed thereto, and a coöperating drive wheel having its axle coincident with the pivotal axis of the carriers and located in a plane outside of the fork member.

6. In a traction-wheel mounting for vehicles the combination with a frame fork having its members provided with fixed terminal rings, of wheel carriers having circular ends rotatably mounted in the respective rings and axle-bearing extensions, spring-controlled frame connections to said axle-bearing extensions for regulating the pivotal swing thereof, a traction wheel axle mounted in said bearings, a shaft centrally mounted in the circular end of one of said carriers, a drive wheel and a reducing gear wheel fixed to said shaft, and a coöperating reducing gear wheel fixed to said axle.

7. In a traction-wheel mounting for vehicles the combination with a frame fork having its members provided with fixed terminal rings, and with wheel-carriers having circular ends rotatably mounted in the respective rings, axle-bearing extensions, and spring-controlled frame connections for regulating the pivotal swing thereof, of a traction wheel axle mounted in said bearings, a shaft centrally mounted in the circular end of one of said carriers, a drive wheel and a reducing gear wheel fixed to said shaft, and a coöperating reducing gear wheel fixed to said axle; said drive wheel being located in a plane outside of the fork members.

8. In a traction-wheel mounting for vehicles the combination with a frame fork having its members provided with fixed terminal rings, and with wheel-carriers having circular ends rotatably mounted in the respective rings, axle-bearing extensions, and spring-controlled frame connections for regulating the pivotal swing thereof, of a traction wheel axle mounted in said bearings, a shaft centrally mounted in the circular end of one of said carriers, a drive wheel and a reducing gear wheel fixed to said shaft, and a coöperating reducing gear wheel fixed to said axle; said wheel carrier being adapted to incase the meshing gears.

In testimony whereof, I affix my signature, in the presence of two witnesses.

ALFRED KUEHN.

Witnesses:
PAUL L. UDELL,
LYDA A. SMITH.

---

Copies of this patent may be obtained for five cents each, by addressing the "Commissioner of Patents, Washington, D. C."